Patented Jan. 2, 1951

2,536,708

UNITED STATES PATENT OFFICE 2,536,708

EDIBLE CALCIUM ALGINATE JELLY

Herbert Frederick Angermeier, Essex Fells, N. J.

No Drawing. Application December 9, 1943,
Serial No. 513,635

19 Claims. (Cl. 99—131)

This invention relates to calcium-alginate jellies, the process of making the same, and to calcium-alginate powder which may be used as the jellying constituent by adding the powder to water and sugar and heating the batch, as hereinafter pointed out more particularly. The calcium-alginate jelly powder may be used for a wide variety of purposes, for example, in making water jellies, fruit jellies and preserves, and jelly candies. The calcium-alginate jelly powder may be used generally for the purposes for which pectin or agar agar is employed.

Edible jellies are now made from sodium alginate powder or some other water soluble alginates such as potassium alginate or magnesium alginate. The sodium alginate powder is incorporated in a batch containing water and sugar, and the batch is boiled to concentrate it to the desired solids content. Thereafter an edible acid is added to the batch and the batch is allowed to cool to form a jelly.

Jellies made from sodium alginate or other water-soluble alginates do not have a jelly strength or structure comparable to that of a pectin or agar agar jelly. By my invention I am able to provide alginate jellies having a jelly strength and structure comparable to pectin or agar agar jellies, and in addition my jelly does not have the objections common to pectin or agar agar jellies, such as syneresis (separation of liquid from the jelly), lack of control of setting time, hydrolysis and slow rate of solution. In accordance with my invention I produce a calcium-alginate jelly by incorporating in the jelly batch not only a water-soluble alginate, such as sodium alginate, potassium alginate, ammonium alginate or magnesium alginate, but also calcium alginate or one or more calcium salts which have the property of reacting with the water-soluble alginate to form insoluble calcium alginate. The batch also contains an alkali-metal phosphate glass for controlling the rate of jellying of the batch during cooking and upon the addition of acid. The invention does not reside in any particular batch proportions, but rather in the use of an alkali-metal phosphate glass for controlling the rate of jellying of calcium-alginates during boiling of the batch or upon cooling of the batch after acidification. During boiling of the batch to produce the desired solids concentration, the sodium phosphate glass or other alkali-metal phosphate glass inhibits the formation of calcium alginate thereby inhibiting jelly formation. It also acts in a similar manner to slow down the rate of jelly formation as the mass cools following addition of acid. Thus by incorporating a calcium salt and an alkali-metal phosphate glass in a jelly batch containing a water-soluble alginate, I can produce calcium-alginate jellies having jelly strength and structure comparable to that of pectin or agar agar jellies, and yet I can inhibit jelly formation during cooking so that I can obtain the desired solids concentration in the batch by boiling it and can control the rate of jellying upon addition of acid so as to adapt the jellying rate to commercial practices.

The alkali-metal phosphate glass which I prefer to employ in controlling the rate of jellying of calcinated alginates is the sodium phosphate glass having a mol ratio of $Na_2O$ to $P_2O_5$ of about 1.1:1. While this is the preferred alkali-metal phosphate glass, other alkali-metal phosphate glasses may be employed in which the mol ratio of alkali-metal oxide to $P_2O_5$ is from about 0.7:1 to 1.7:1. The proportions of the various ingredients making up the batch may be varied over wide ranges in order to produce calcium-alginate jellies of widely different properties.

In the commercial practice of my invention it is desirable to provide a powder which is sold to the jelly maker. The jelly maker incorporates the powder in a jelly batch which contains water and sugar and, in some cases, fruit juices and coloring matter. The calcium-alginate jelly powder is made by milling together a water-soluble alginate, such as sodium alginate, potassium alginate or magnesium alginate, any edible calcium salt which is soluble in a water solution containing sodium phosphate glass, and alkali-metal phosphate glass. The preferred water-soluble calcium salts are the citrate, acetate, tartrate or chloride, although it is to be understood that any other water-soluble calcium salt may be used in place of any of the calcium salts which have been specifically mentioned. The water-soluble sodium alginate which I prefer to use is of the low ash type. The preferred alkali-metal phosphate glasses are the sodium phosphate glasses, and of the sodium phosphate glasses I prefer to employ one having a mol ratio of $Na_2O$ to $P_2O_5$ of about 1.1:1.

It will be understood that instead of employing a calcium-alginate powder containing a calcium salt which reacts with sodium alginate to form calcium-alginate when the powder is dissolved, I may incorporate preformed calcium alginate in the powder. Although calcium alginate is not soluble in water it is soluble in a water solution containing sodium phosphate glass. In this case the sodium phosphate glass solubilizes the calcium alginate, and thereafter inhibits the precipitation of calcium alginate during boiling of the jelly batch.

The proportions of the water-soluble alginate, the calcium salt and the sodium phosphate glass in the jelly-making batch or in the powder may vary over a considerable range depending upon the physical characteristics desired in the jelly and the soluble solids in the jelly. The ratio of sodium phosphate glass required for inhibiting the precipitation of calcium alginate during processing of the batch depends upon the soluble solids content of the jelly and upon the amount of calcium ion in the batch. However, for any given jelly having a given proportion of calcium salt, a given percentage of soluble solids and a given pH of the batch, there is an optimum ratio of sodium phosphate glass to calcium ion. Unless the amount of sodium phosphate glass is high enough in relation to the amount of calcium salt, the batch tends to scorch in the kettle when being boiled to obtain the desired solids concentration, and furthermore, the jellying rate upon acidification is too rapid for commercial applications. In commercial use a certain amount of time is required between the addition of the acid and the jellying of the mass in order to allow for manipulation of the mass.

In order to inhibit precipitation of calcium alginate in processing the batch, the ratio of sodium phosphate glass to calcium salt should be increased directly with the increase of sugar solids of the jelly. The following are two examples illustrating the desirable proportions of the ingredients used in making a 10% soluble solids jelly, and an 80% soluble solids jelly; Example 1 illustrating the 10% soluble solids jelly, and Example 2 the 80% soluble solids jelly. In each of these two examples the calcium-alginate powder contains approximately 5% of calcium salt. The ingredients are given in these examples, and in all other examples, in parts by weight.

Example 1

5 parts calcium chloride ($CaCl_2.6H_2O$)
5 parts sodium phosphate glass
90 parts sodium alginate A 10% soluble solids jelly may be made with the above jelly powder from:

2 parts jelly powder
10 parts sugar
90 parts water

The batch which has a pH of about 6–8 is boiled for 30 seconds, the heat is turned off, and 2 parts of citric acid or other edible acid are added. The batch is allowed to cool to set.

Example 2

5 parts calcium chloride ($CaCl_2.6H_2O$)
20 parts sodium phosphate glass
90 parts sodium alginate An 80% soluble solids jelly may be made with the No. 2 jelly powder by using:

2 parts No. 2 jelly powder
30 parts water
80 parts sugar

The batch which has a pH of about 6–8 is boiled to 227° F., the fire is turned off, and 2 parts of citric acid or other edible acid are added. The batch is then allowed to cool to set.

From Examples 1 and 2 it will be seen that the ratio of sodium phosphate glass to calcium salt should be increased directly with the increase of sugar solids in the finished jelly. In these examples the commercial form of calcium chloride ($CaCl_2.6H_2O$) was employed. In Example 1 the ratio by weight of sodium phosphate glass to calcium ion was about 5:1, whereas in Example 2 it was about 20:1. It should be noted that although the high sugar solids jelly (No. 2) could be made from the No. 1 jelly powder, the low sugar solids jelly (No. 1) could be made from the No. 2 jelly powder since an excess of the sodium phosphate glass is not detrimental.

The amount of sodium phosphate glass which should be employed varies also according to the amount of calcium salt in the batch. Generally speaking, at a given soluble solids content in the jelly, the amount of sodium phosphate glass increases with increasing amounts of calcium salt. This is illustrated by Examples 3, 4 and 5. Example 3 illustrates the calcium-alginate powder composition containing approximately the lowest calcium ion concentration which is practical for commercial use.

Example 3

0.25 part calcium chloride ($CaCl_2.6H_2O$)
3.0 parts sodium phosphate glass
96.75 parts sodium alginate Example 4 illustrates the proportions of sodium alginate, calcium salt and sodium phosphate glass preferred by me when the calcium-alginate powder consists only of the ingredients mentioned in this example.

Example 4

10 parts calcium chloride ($CaCl_2.6H_2O$)
35 parts sodium phosphate glass
55 parts sodium alginate Example 5 illustrates a calcium-alginate powder having a high proportion of water-soluble calcium salt and a high proportion of sodium phosphate glass.

Example 5

20 parts calcium chloride ($CaCl_2.6H_2O$)
75 parts sodium phosphate glass
5 parts sodium alginate Because of the small percentage of sodium alginate in composition 5, it is necessary to use a large amount of the powder in making a jelly if the jelly is to have a high strength.

The jelly strength of sodium alginate is greatly affected by the calcium ion concentration. The optimum alginate jelly powder is the one that has the greatest jelly strength over a wide range of sugar concentrations and pH values of the jelly batch. In my preferred formula the ratio of sodium phosphate glass to calcium salt is such that perfect handling is possible over all ranges of sugar concentration and hydrogen ion concentration used in commercial jelly practice.

In all of the preceding examples calcium chloride was used as illustrative of a calcium salt because of its high solubility. However, in my preferred commercial formula I use a combination of water-soluble calcium salts, my preferred commercial formula for calcium-alginate powder being as follows, the proportions being given in parts by weight:

Example 6

8 parts calcium citrate
1.5 parts calcium oxide
0.5 part calcium stearate
35 parts sodium phosphate glass
55 parts sodium alginate In place of the calcium citrate I may use calcium acetate, tartrate or saccharate. In place of the calcium oxide I may use calcium hydroxide. In place of the calcium stearate I may employ any higher fatty acid or its salts.

The proportions of ingredients given in Example 6 may be varied within the following ranges and still produce excellent results.

Example 7

2 to 15 parts calcium citrate, acetate, tartrate or saccharate
0.5 to 5% calcium oxide or hydroxide
0.1 to 2% calcium stearate or higher fatty acid or higher fatty acid salts
10 to 50 parts sodium phosphate glass
34 to 88 parts sodium alginate The calcium citrate or its equivalent produces a short, clean-breaking jelly, a type of jelly particularly desirable in confections, as contrasted with a soft mushy jelly. The calcium oxide or hydroxide is used as a pH adjusting agent which adjusts the pH of the batch when cooking to between about 6 and 8. The calcium stearate or its equivalent inhibits scorching of the batch during cooking.

In my process the water-soluble alginate, for example sodium alginate, potassium alginate, ammonium alginate or magnesium alginate, or mixtures thereof, may be employed in amounts constituting about 4 to 97% by weight of the calcium-alginate powder, the preferred range for the water-soluble alginate being about 34 to 88%. The sodium phosphate glass or other alkali-metal phosphate glass constitutes about 3 to 75%, and preferably is between 10 and 50%. The calcium salt is from about 0.25 to 20% of the composition and preferably is between 2 and 15%.

My calcium-alginate jelly powder is readily soluble in aqueous solutions having a pH not lower than 5. It is not soluble in fruit juices of low pH value. Therefore, when fruit juices are to be used which impart low pH values to the batch, the calcium alginate powder should be dissolved in the batch and the batch boiled to the desired solids concentration and cooled slightly before the fruit juice is added to the batch.

In describing the invention I have indicated that a calcium-alginate powder containing the alkali-metal phosphate glass is first formed by mixing the ingredients, and the powder is then added to water and sugar, and the batch is cooked, acidified and cooled to produce the jelly. It should be understood, however, that the order in which the ingredients may be added to the other constituents of the jelly batch may be varied. For example, a jelly may be made using straight sodium alginate in the cook, then adding the proper amounts of calcium salt and sodium phosphate glass after cooking but before acidification. A jelly may also be made by using a mixture of sodium alginate and sodium phosphate glass in the cook and then adding the calcium salt after cooking but before acidification. A jelly may also be made by using a mixture of sodium alginate and calcium salt in the cook, then adding the sodium phosphate glass after cooking but before acidification. However, this last described method is not as desirable as the other methods because the batch tends to become too viscous and hard to cook.

My preferred method of making a water type jelly is as follows:

Example 8

The calcium-alginate powder is dry-mixed with 5 times its weight of sugar and the mixture is dispersed in boiling water. When all of the ingredients have dissolved, the balance of the sugar is added and the mass is boiled to the desired concentration. The fire is then turned off, and when the mass has stopped boiling the desired amount of edible acid is added and the mass is allowed to cool and set. The amount of edible acid depends upon the taste desired in the finished jelly, and is such as to produce a pH in the batch between 2 and 5. Any edible acid may be employed, the preferred acids being citric acid, tartaric acid, lactic acid, malic acid and phosphoric acid.

If Example 8 is modified by incorporating in the batch corn syrup, which lowers the pH of the batch from about 6–8 to about 5, it is desirable to add to the batch before the corn syrup is added an amount of sodium phosphate glass in addition to that included in the calcium-alginate powder, if the powder is of the preferred composition given in Example 6. This additional amount of sodium phosphate glass is for the purpose of inhibiting the precipitation of calcium alginate due to the hydrogen ion concentration of the corn syrup. This additional amount of sodium phosphate glass equal to 20% of the weight of the calcium-alginate powder is sufficient to inhibit the precipitation of calcium alginate during cooking.

My preferred method of making a fruit jelly or preserve is as follows:

Example 9

The calcium-alginate jelly powder is dry-mixed with 5 times its weight of sugar and the mixture is stirred into boiling water. When the ingredients are all dissolved, the balance of the sugar is added and the batch is brought to a good boil. If the calcium-alginate powder has the ratio of sodium phosphate glass to calcium salt given in Example 6, I add an additional amount of sodium phosphate glass to the batch before adding the fruit or juice. The amount of sodium phosphate glass to be added depends upon the amount and the pH of the fruit or juice to be used. If the fruit or juice will reduce the pH of the batch to about 3, I add to the batch an amount of sodium phosphate glass equal to about 20% of the weight of the calcium-alginate powder. After the added sodium phosphate glass has dissolved and the batch has been cooked to the desired solids concentration or even above the desired solids concentration, the fruit or juice is added and the mass is cooked back to the desired concentration as rapidly as possible. The fire is then turned off, and when the mass has stopped boiling, the desired amount of edible acid is added and the batch is allowed to cool and set. The amount of edible acid to be added is determined according to the taste desired in the finished jelly, as pointed out in connection with Example 8, and is such as to produce a pH of about 2 to 5.

While in all of the examples I have shown that 2% of my calcium-alginate powder based on the weight of the finished batch will yield a jelly of good commercial strength and structure, lower concentrations of the powder may be used also. Thus, where a soft jelly is desired the amount of the powder may be as low as about 0.25%, and where a very stiff jelly is required the powder may constitute up to about 2½% by weight of the finished batch.

The invention is not limited to the examples which have been given merely for illustrative purposes, but may be otherwise embodied or practiced within the scope of the following claims.

I claim:

1. A batch for forming an edible calcium-alginate jelly, which comprises a water-soluble alginate, a calcium salt which is soluble in a water solution containing alkali-metal phosphate glass, sugar, an alkali-metal phosphate glass, and water, said batch having a pH between about 6 and 8 and when boiled to increase the solids concentration, acidified, and cooled producing a calcium-alginate jelly.

2. A batch for forming an edible calcium-alginate jelly, which comprises sodium alginate, a calcium salt which is soluble in a water solution containing alkali-metal phosphate glass, sugar, an alkali-metal phosphate glass, and water, said batch having a pH between about 6 and 8 and when boiled to increase the solids concentration, acidified, and cooled producing a calcium-alginate jelly.

3. A batch for forming an edible calcium-alginate jelly, which comprises sodium alginate, calcium citrate, sugar, an alkali-metal phosphate glass, and water, said batch having a pH between about 6 and 8 and when boiled to increase the solids concentration, acidified, and cooled producing a calcium-alginate jelly.

4. A batch for forming an edible calcium-alginate jelly, which comprises sodium alginate, calcium oxide, a calcium salt which is soluble in a water solution containing alkali-metal phosphate glass, sugar, an alkali-metal phosphate glass, and water, said batch having a pH between about 6 and 8 and when boiled to increase the solids concentration, acidified, and cooled producing a calcium-alginate jelly.

5. A batch for forming an edible calcium-alginate jelly, which comprises sodium alginate, calcium oxide, calcium citrate, sugar, an alkali-metal phosphate glass, and water, said batch having a pH between about 6 and 8 and when boiled to increase the solids concentration, acidified, and cooled producing a calcium-alginate jelly.

6. A batch for forming an edible calcium-alginate jelly, which comprises a water-soluble alginate, a calcium salt which is soluble in a water solution containing alkali-metal phosphate glass, sugar, an alkali-metal phosphate glass, water, and a small amount of a fatty material, said batch having a pH between about 6 and 8 and when boiled to increase the solids concentration, acidified, and cooled producing a calcium-alginate jelly.

7. A composition for making edible alginate jelly, comprising effective amounts of a water-soluble alginate, a calcium salt which is soluble in a water solution containing sodium phosphate glass, and a sodium phosphate glass, said composition when dissolved in water having a pH between about 6 and 8.

8. A composition for making edible alginate jelly, comprising effective amounts of a water-soluble alginate, a calcium salt of the group consisting of calcium citrate, calcium acetate, calcium tartrate, and calcium saccharate and a sodium phosphate glass, said composition when dissolved in water having a pH between about 6 and 8.

9. A composition for making edible alginate jelly, comprising by weight about 4 to 97% of a water-soluble alginate, about 0.25 to 20% of a calcium salt which is soluble in a water solution containing sodium phosphate glass, and about 3 to 75% of sodium phosphate glass, said composition when dissolved in water having a pH between about 6 and 8.

10. A composition for making edible alginate jelly, comprising by weight about 34 to 88% of a water-soluble alginate, about 2 to 15% of a calcium salt which is soluble in a water solution containing sodium phosphate glass, and about 10 to 50% of sodium phosphate glass, said composition when dissolved in water having a pH between about 6 and 8.

11. A composition for making edible alginate jelly, comprising by weight about 55% of a water-soluble alginate, about 10% of a calcium salt which is soluble in a water solution containing sodium phosphate glass, and about 35% of sodium phosphate glass, said composition when dissolved in water having a pH between about 6 and 8.

12. A composition for making edible alginate jelly, comprising about 34 to 88% of a water-soluble alginate, about 2 to 15% of a salt of the group consisting of calcium citrate, calcium acetate, calcium tartrate and calcium saccharate, and about 10 to 50% of sodium phosphate glass, said composition when dissolved in water having a pH between about 6 and 8.

13. A composition for making edible alginate jelly, comprising about 34 to 88% of a water-soluble alginate, about 2 to 15% of a salt of the group consisting of calcium citrate, calcium acetate, calcium tartrate and calcium saccharate, about 10 to 50% of sodium phosphate glass, and about 0.1% to 2% of an anti-scorching agent of the group consisting of the higher fatty acids and higher fatty acid salts, said composition when dissolved in water having a pH between about 6 and 8.

14. A composition for making edible alginate jelly, comprising about 34 to 88% of a water-soluble alginate, about 2 to 15% of a salt of the group consisting of calcium citrate, calcium acetate, calcium tartrate and calcium saccharate, about 10 to 50% of sodium phosphate glass, and an effective amount of pH adjusting material for adjusting the batch to which the composition is added to a pH of between about 6 and 8 when the batch is cooking.

15. The process of making an edible alginate jelly, which comprises forming a jelly batch containing water, sugar, a water-soluble alginate, an alkali-metal phosphate glass and a calcium salt which is soluble in a water solution containing alkali-metal phosphate glass, boiling the batch for a time sufficient to substantially increase the solids concentration while maintaining the pH of the batch between about 6–8, adding acid to reduce the pH of the batch to about 2–5 and cooling to form a jelly.

16. The process of making an edible alginate jelly, which comprises forming a jelly batch containing water, sugar, a water-soluble alginate, an alkali-metal phosphate glass having a mol ratio of alkali-metal oxide to $P_2O_5$ from about 0.7:1 to 1.7:1, and a calcium salt which is soluble in a water solution containing alkali-metal phosphate glass, boiling the batch for a time sufficient to substantially increase the solids concentration while maintaining the pH of the batch between about 6-8, adding acid to reduce the pH of the batch to about 2-5 and cooling to form a jelly.

17. The process of making an edible alginate jelly, which comprises forming a jelly batch containing water, sugar, and a water-soluble alginate, a sodium phosphate glass having a mol ratio of alkali-metal oxide to $P_2O_5$ from about 0.7:1 to 1.7:1 and a calcium salt which is soluble in a water solution containing sodium phosphate glass, boiling the batch for a time sufficient to substantially increase the solids concentration while maintaining the pH of the batch between about 6-8, adding acid to reduce the pH of the batch to about 2-5 and cooling to form a jelly.

18. The process of making an edible alginate jelly, which comprises dry-mixing water-soluble alginate, an alkali-metal phosphate glass, a calcium salt which is soluble in a water solution containing alkali-metal phosphate glass and sugar, the sugar amounting to several times the weight of the other ingredients, dissolving the mix in water, adding more sugar, boiling the batch for a time sufficient to substantially increase the solids concentration while maintaining the pH of the batch between about 6-8, adding acid to reduce the pH of the batch to about 2-5 and cooling to form a jelly.

19. The process of making an edible alginate jelly, which comprises forming a jelly batch containing water, sugar, a water-soluble alginate, an alkali-metal phosphate glass and a calcium salt which is soluble in a water solution containing alkali-metal phosphate glass, boiling the batch for a time sufficient to substantially increase the solids concentration while maintaining the pH of the batch between about 6 and 8, and after boiling of the batch has stopped, adding acid to reduce the pH of the batch to about 2-5 and cooling to form a jelly.

HERBERT FREDERICK ANGERMEIER.

REFERENCES CITED

The following references are of record in the file of this patent:

UNITED STATES PATENTS

| Number | Name | Date |
|---|---|---|
| 1,946,649 | Thomas | Feb. 13, 1934 |
| 2,036,934 | Green | Apr. 7, 1936 |
| 2,064,387 | Schwartz | Dec. 15, 1936 |
| 2,135,054 | Schwartz | Nov. 1, 1938 |
| 2,207,299 | Mnookin | July 9, 1940 |
| 2,405,861 | Tod | Aug. 13, 1946 |
| 2,420,308 | Gates | May 13, 1947 |

OTHER REFERENCES

Schwartz et al. in Industrial and Engineering Chemistry, Jan. 1942, pp. 32-40.